United States Patent [19]

Drews

[11] Patent Number: 5,122,008
[45] Date of Patent: Jun. 16, 1992

[54] METHOD OF MANUFACTURING BARRIERS

[76] Inventor: Terence Drews, 119 Brock La., Grand Rapids, Minn. 55744

[21] Appl. No.: 795,020

[22] Filed: Nov. 20, 1991

Related U.S. Application Data

[62] Division of Ser. No. 583,327, Sep. 17, 1990.

[51] Int. Cl.$^5$ .................... E01F 13/00; E01F 15/00
[52] U.S. Cl. ............................ 404/6; 256/1; 256/13.1
[58] Field of Search ............... 256/1, 13.1; 404/6; 249/1, 114.1, 105; 425/1-5

[56] References Cited

U.S. PATENT DOCUMENTS

| | | | |
|---|---|---|---|
| 3,880,404 | 4/1975 | Fitch | 404/6 X |
| 3,885,502 | 5/1975 | Sarno et al. | 404/6 X |
| 4,289,419 | 9/1981 | Young et al. | 404/6 |
| 4,452,431 | 6/1984 | Stephens et al. | 404/6 X |
| 4,552,341 | 11/1985 | Zucker et al. | 256/1 |
| 4,824,282 | 4/1989 | Waldecker | 404/6 |
| 5,054,954 | 10/1991 | Cobb et al. | 404/6 |

*Primary Examiner*—Ramon S. Britts
*Assistant Examiner*—Nancy P. Connolly
*Attorney, Agent, or Firm*—Evenson, Wands, Edwards, Lenahan & McKeown

[57] ABSTRACT

A barrier is manufactured by inserting a cage frame into the mold. The cage frame forms a clearance gap between the frame side walls and the mold side walls. The cage frame is first substantially filled with vehicle tire material and secondly filled with non-recyclable plastic material. An adhesive-type liquid is poured into the clearance gap to fill the sides of the mold. The top of the mold is coupled into place and the adhesive liquid is poured through the top to fill up the mold. The mold is then cured to produce the barrier.

7 Claims, 7 Drawing Sheets

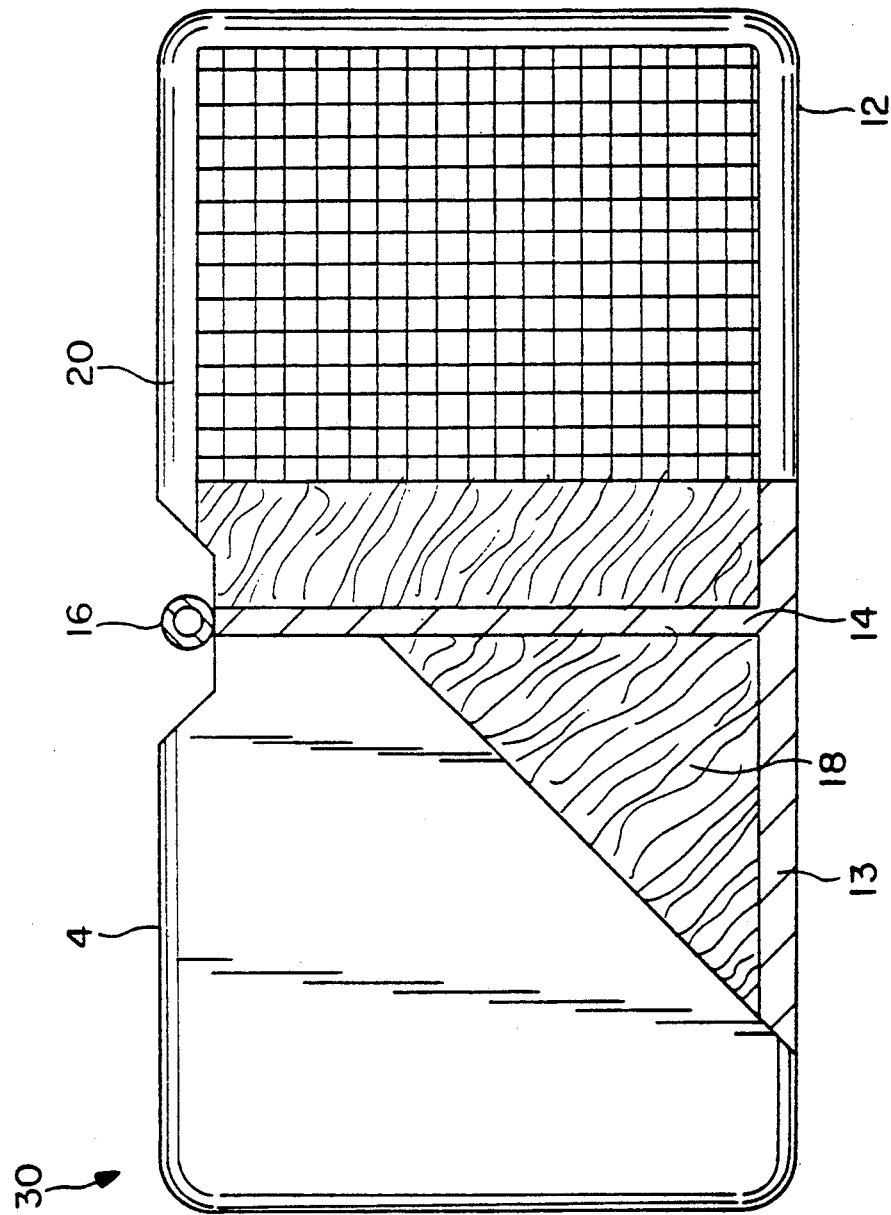

METHOD OF MANUFACTURING BARRIERS

This is a divisional of application Ser. No. 07/583,327 filed Sep. 17, 1990.

BACKGROUND AND SUMMARY OF THE INVENTION

This invention relates to a method of manufacturing and forming various types of barriers used, for example, in safeguarding highways, providing temporary water dams and for forming portable walls.

For many years, highways have been provided with barriers such as dividers for separating traffic lanes and to protect construction crews working on the highways. The dividers are often permanently installed on the highways and, in almost all instances, are temporarily installed for the duration of construction work. These barriers are usually made with concrete and are formed in sections approximately ten feet long and having a cross-section similar to that of a truncated pyramid. The barriers are elongated such that they can be placed in an end-to-end relationship. Typical concrete dividers can weigh over 3,000 pounds and are very cumbersome to transport and arrange.

In addition, the concrete dividers' rigidity does not allow for the absorption of impact forces upon a collision. This has the disadvantageous effect of causing automobiles to bounce off the barrier and back into the flow of traffic which can create other accidents.

Other known highway barriers are constructed of a light-weight hollow barrier shell which is filled at the construction site with a ballast material such as water, sand or other fluid material. These barriers, however, require an inordinate amount of labor to assemble at the site due to the filling of the barrier shells.

Also known is a marker block used for visually separating traffic lanes. The marker block has dimensions of approximately 1 meter long and 8 cm high. This type of marker can be formed from an elastic material, preferably vulcanized or recycled rubber. The rubber reduces the tension and forces acting upon the marker material. These small markers are formed by using discarded tires which are cut into small pieces and mixed with a suitable adhesive. The mixture is then filled into a mold of the desired shape and solidifies to a prismatic, elastic block. These small marker blocks, however, are used to visually distinguish between lanes rather than forming highway barriers having large dimensions and which protect against high impact collisions. Further, the cost and effort of molding large barriers with this type of premixed mixture becomes prohibitive.

The present invention provides a method for manufacturing large barriers from used tires, non-recyclable plastics, or similar articles. This has the advantage of diminishing the tremendous stockpile of tires across the country that have festered as breeding grounds for fires and all types of undesirable rodents and insects. Similarly, the growing amounts of non-recyclable scrap plastic which pose environmental hazards are also diminished. The present invention makes use of large quantities of both scrap tires and non-recyclable plastics in the manufacture of the barriers.

It is an advantage of the present method to insert a cage frame formed of either a metal or plastic mesh material having a metal base, such as a steel plate, into the manufacturing mold. The frame is dimensioned to fit into the mold and have an approximate quarter-inch clearance from the mold sides.

It is a further advantage to provide the cage frame with a vertical rod attached to the metal base and extending outward from the mold. The rod includes a ringed portion at its outer end to aid in lifting the finished product from the mold, other types of lifting devices are also being possible.

The inserted cage is filled within approximately two inches from the top with scrap tires which have been cut into the desired size pieces. The final two inches may then be filled with shredded non-recyclable plastics. Alternatively, the mold may be completely filled with either the scrap tires or non-recyclable plastics.

An epoxy or adhesive-type material is then poured into the clearance gap formed between the mold and the cage. The material flows through the cage frame mesh and partially into the rubber pieces, forming a solid case around the entire block while leaving the interior elastic material unbonded for energy absorbing purposes. This minimizes the amount of epoxy necessary and thus reduces the barrier cost. Once the liquid is set, the product is removed and cured. This produces a sturdy, portable or permanent barrier which can then be finished with a sealant and painted. Alternately, the epoxy itself can be colored prior to curing to produce variously colored barriers.

It is an advantage of the manufacturing process for the barriers that it can be performed indoors or outdoors over a wide range of temperatures, e.g. 50°–150° F. Further, the process does not require a heated mold, environmental controls, mechanical devices, etc., as are found in traditional molding processes. This reduces the manufacturing expenses.

These and other advantages of the present invention are more readily apparent with reference to the following description and claims in light of the accompanying drawings.

BRIEF DESCRIPTION OF THE DRAWINGS

FIG. 3 is a partial cut away view of a barrier manufactured in accordance with the present invention;

DETAILED DESCRIPTION OF THE DRAWINGS

Figure 1:
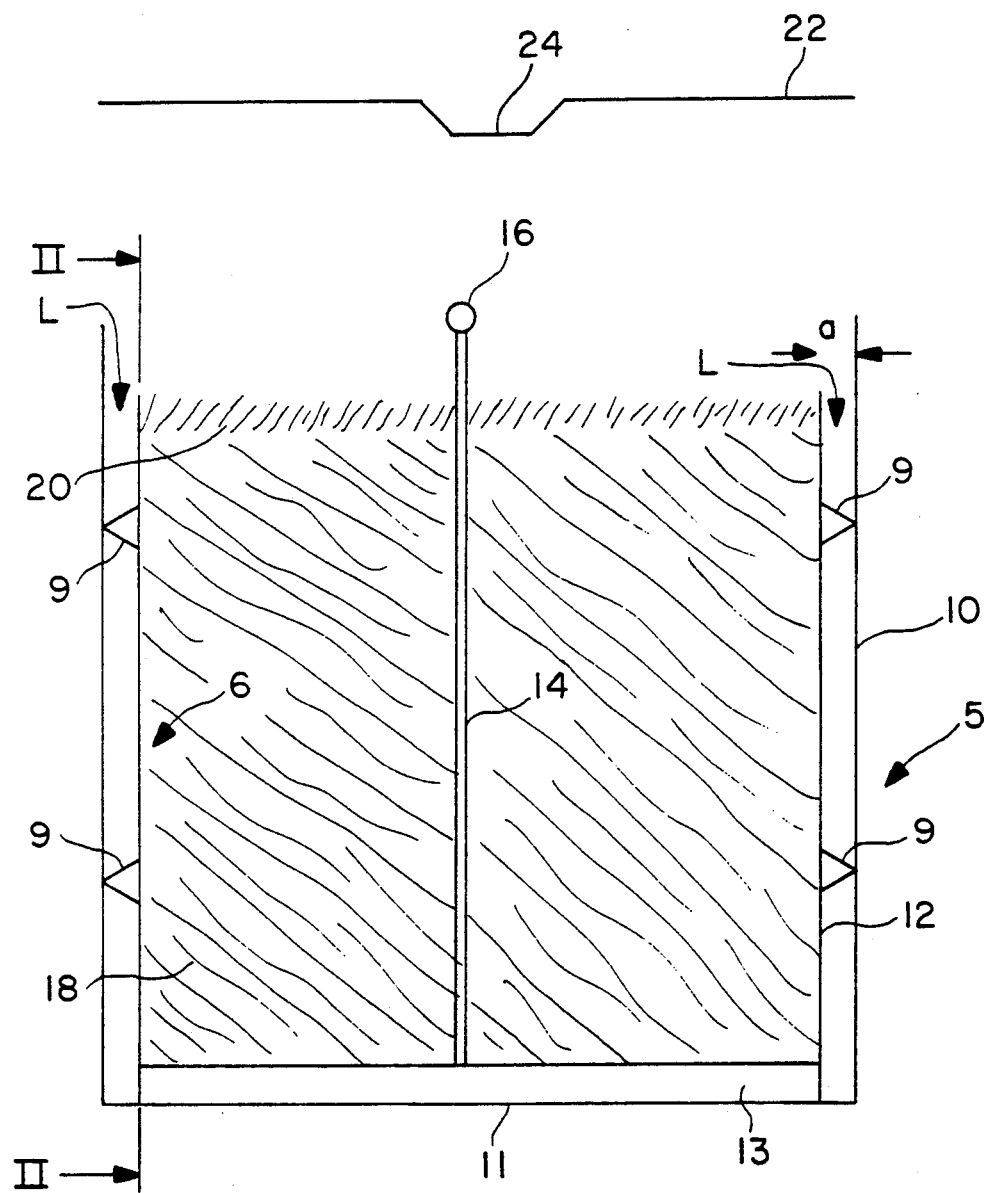
FIG. 1 is a cross-section of the mold including the cage frame for forming a barrier of the present invention.

Referring to FIG. 1, a mold is shown generally indicated by arrow 5 including sides 10 and bottom 11. The mold 5 is illustrated as a rectangular shape but it is readily understood that the mold 5 can be of any shape necessary to produce the desired barrier.

Inserted into the mold 5 is a cage frame 6 having upright sides 12 and a base 13. The cage frame 6 is made from either a metal or plastic mesh depending upon the use of the finished barrier product and includes a steel base 13. The cage frame 6 is dimensioned to fit into the mold 5 and have a clearance gap "a" of approximately one-quarter of an inch between the mold sides 10 and the cage sides 11. The gap "a" may be maintained by either fixing the mold through the use of brackets (not shown) or using spacers 9, which may be of any shape and made of any inexpensive material allowing them to be left in the barrier when finished. As shown in FIG. 1, the spacers 9 have a triangular shape with their pointed end against the inner side wall of the mold 10. The use of different sized spacers allows the gap size "a" to be easily changed.

The cage's base 13 is formed from a metal material, such as steel, which is sturdy enough to allow the lifting of the entire finished product from the mold. Coupled to the center of the base 13 is a rod 14 arranged substantially perpendicular to the base 13 plane. The rod 14 includes a ring 16 formed at its opposite end from the base 13 to provide a lifting mechanism. Other lifting mechanisms such as hooks or handles are also possible.

The cage 16 is substantially filled with pieces of an elastic material 18, preferably with scrap tire pieces which have been cut to approximately a one-by-two inch size. The elastic material 18 fills all but approximately the top two inches of the cage frame 6. The remaining volume of the cage frame 6 is filled with shredded, non-recyclable plastic material 20.

Once the cage frame 6 is filled with the materials 18 and 20, an epoxy-like liquid including a hardener additive is poured into the clearance gap "a" between the mold sides 10 and the cage frame sides 12, as indicated generally by arrows L. After the epoxy-like material, which can be a latex rubber type of material, has filled the clearance gaps, then the mold top 22 is coupled into place with the cage frame sides 10. The top 22 includes a recessed portion 24 through which the rod 14 and ring 16 extend. This allows the barrier to be formed such that the ring 16 does not extend above the planar top surface of the barrier.

Upon securing the top 22, the mold is then completely filled with the epoxy-like material. The material flows through the cage frame mesh and partially into the elastic materials 18 and 20. Depending upon the amount of hardener used in the epoxy material, the degree of penetration of the epoxy into the elastic materials can be regulated to achieve the desired energy absorbing characteristics for the barrier. Thus, a large percentage of the elastic materials are unbonded and provide air pockets in the finished barrier. Not only does this provide variable energy absorbing characteristics as noted above, but it further reduces the cost of the barrier by reducing the amount of the epoxy necessary. Further, no premixing of the elastic materials wit the epoxy is required. Once the epoxy sets, the product is removed from the mold 5. After completely curing the barrier, it may be sprayed or coated with a sealer paint. Alternatively, the latex epoxy can be colored and tinted in advance of forming the barrier.

In the preferred embodiment, the highway barrier has dimensions of $5' \times 5' \times 2.5'$. With this size barrier, approximately 40 tires will be recycled. The tires are cut into the desired size, for example, using a commercially available shredding machine.

Figure 2:
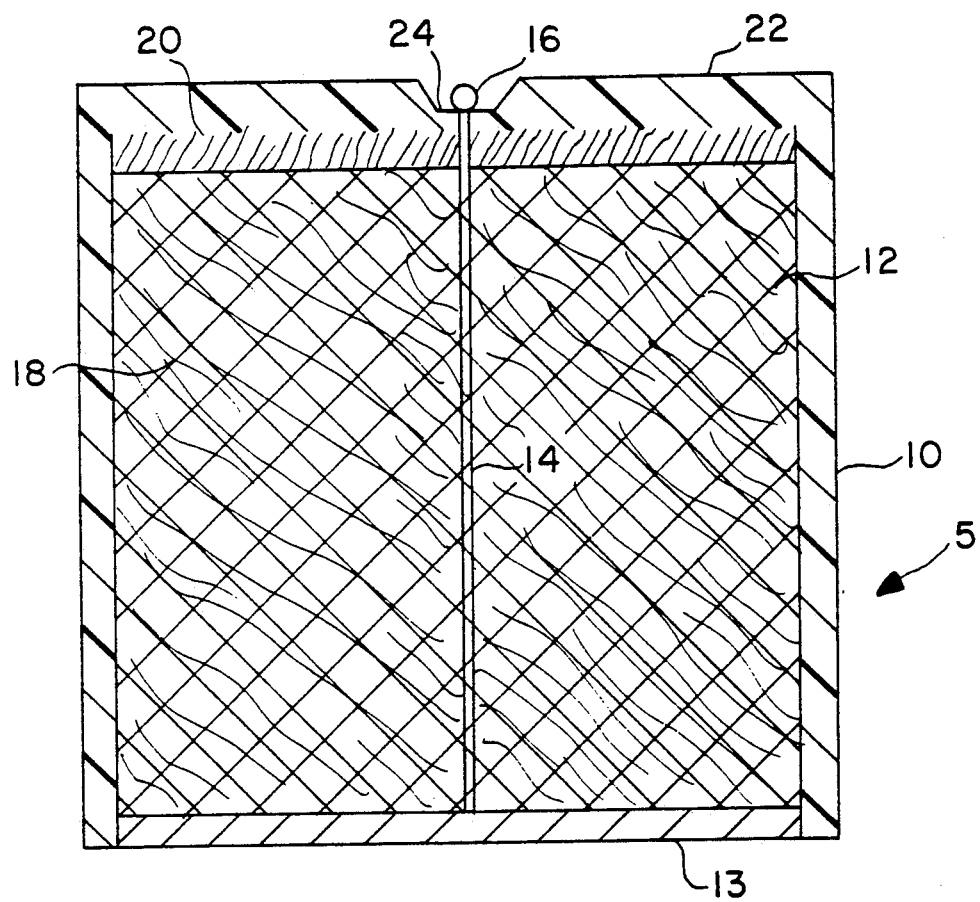
FIG. 2 is a view taken along line II—II of FIG. 1.

FIG. 2 is a side view taken along line II—II of FIG. 1. The cage frame sides 12 are shown as being of a mesh configuration. The mesh is made from either metal or plastic depending upon the application of the barrier. For example, when using the barrier as a portable highway barrier or divider, the cage frame is formed of a metal construction at its base 13 and has a side wall 12 construction of plastic. This minimizes the damage from occurring in the event of the barrier is impacted sufficiently to break it open during a collision.

The mold top 22 is shown assembled in FIG. 2. The rod's ring 16 extends through the top recess 24 but is below the top plane of the mold. Not only does the ring 16 allow for the barrier to be removed from the mold 5, but it also provides a simple and efficient means for lifting and transporting the barrier in use.

Figure 4:
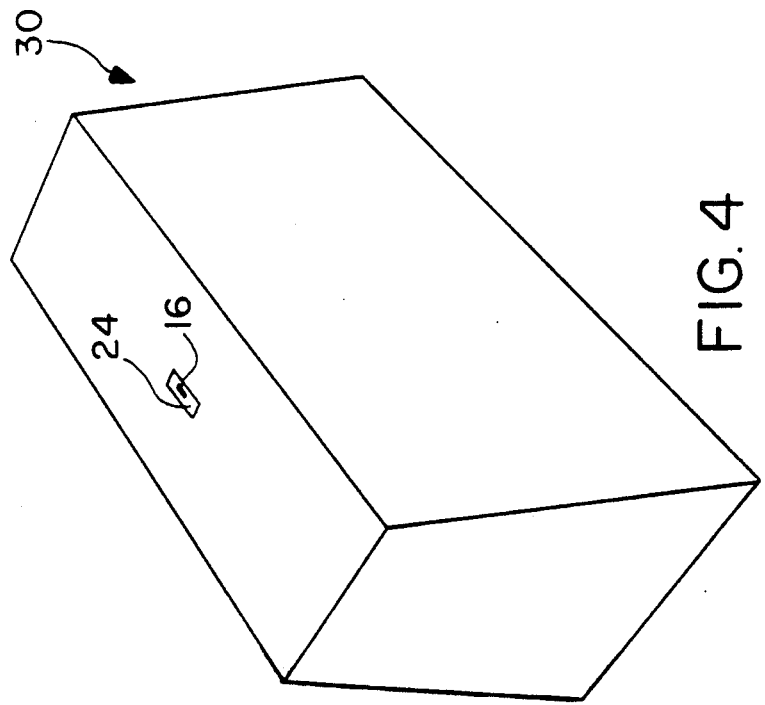
FIG. 4 is an example of a stacking block barrier formed according to the present invention.

A perspective view of a finished highway barrier 30 is shown in FIG. 4. The barrier 30 is of the type commonly used as a highway divider. This type of barrier, constructed in accordance with the present invention, is of substantially lesser weight than customary concrete dividers. The barrier is approximately 1,000–1,200 pounds while still achieving the desired effects of preventing vehicle crossovers. Preferably, the highway barrier has a weight allocation of approximately 88% elastic material, 10% cage weight, and 2% epoxy exterior. Depending upon the size and type of elastic materials 18 and 20 used, along with the amount of epoxy material applied, the highway barrier 30 provides resilience to absorb impact energy. This reduces the ultimate effects of a collision.

FIG. 3 is a partially cut away view of a barrier 30 produced in accordance with the present invention. The left side of the figure illustrates the outer epoxy casing 30 and the right side illustrates the cage frame side wall 12. The interior includes the shredder rubber 18 and the shredded plastic material 20.

The highway barrier design 30, or any other type of barrier, can be easily colored by inserting a dye into the molding process. Thus, the barriers can be colored for enhanced visibility or aesthetic reasons.

Figure 5:
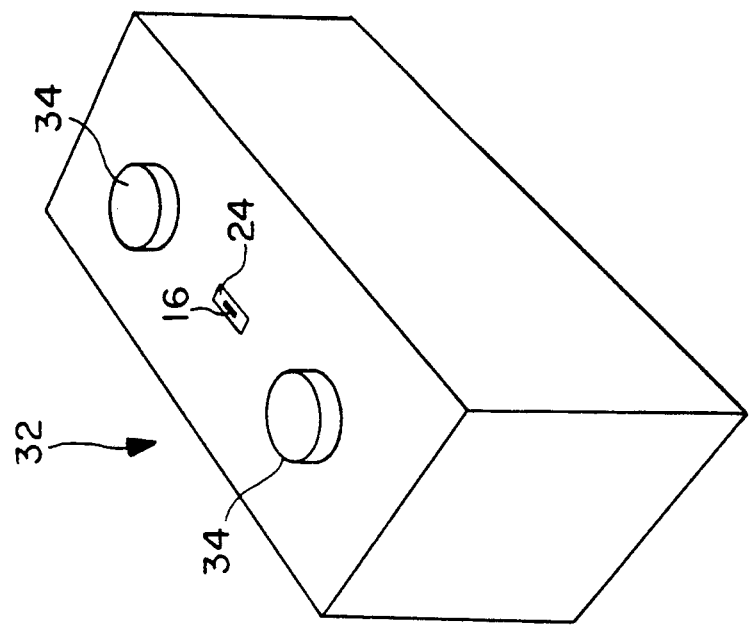
FIG. 5 illustrates the manner in which the stacking block barriers of FIG. 4 can be arranged.
Figure 6:
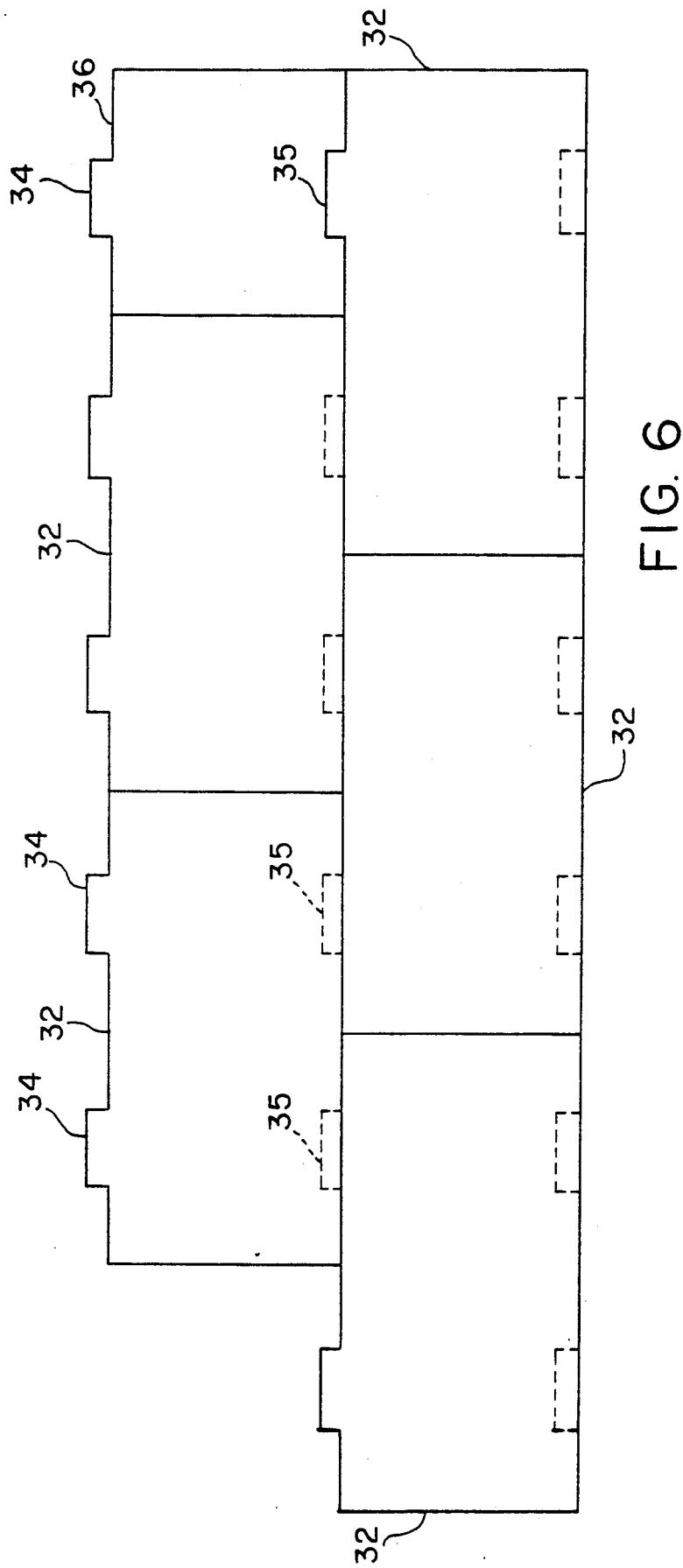
FIG. 6 is a perspective view of a triangle barrier formed according to the present invention.

FIG. 5 is a perspective view of a stacking block barrier 32 formed according to the method of the present invention. In the manufacture of the block 32, an all-metal cage is used for extra strength to enable the blocks 32 to be stacked on top of one another as shown in FIG. 5. The blocks 32 are of a substantially rectangular design and include two cylindrical posts 34 on their top side. Further, as shown in FIG. 5, cylindrical recesses or cavities 35 are provided on the underside of the blocks 32. The cavities 35 are formed slightly larger than the posts 34 such that the blocks 32 can be stacked upon one another in an interlocking manner. Also shown in FIG. 6, is an end block 36 which is of a square design and features an identical post 34 and cavity 35 as for the rectangular blocks 32. This square block 36 is used to square off an end of a stacked block section. The stacked design may be used for temporary water damming or whatever portable walls may be required, such as for commodity storage for grain stocks, etc.

Figure 7:
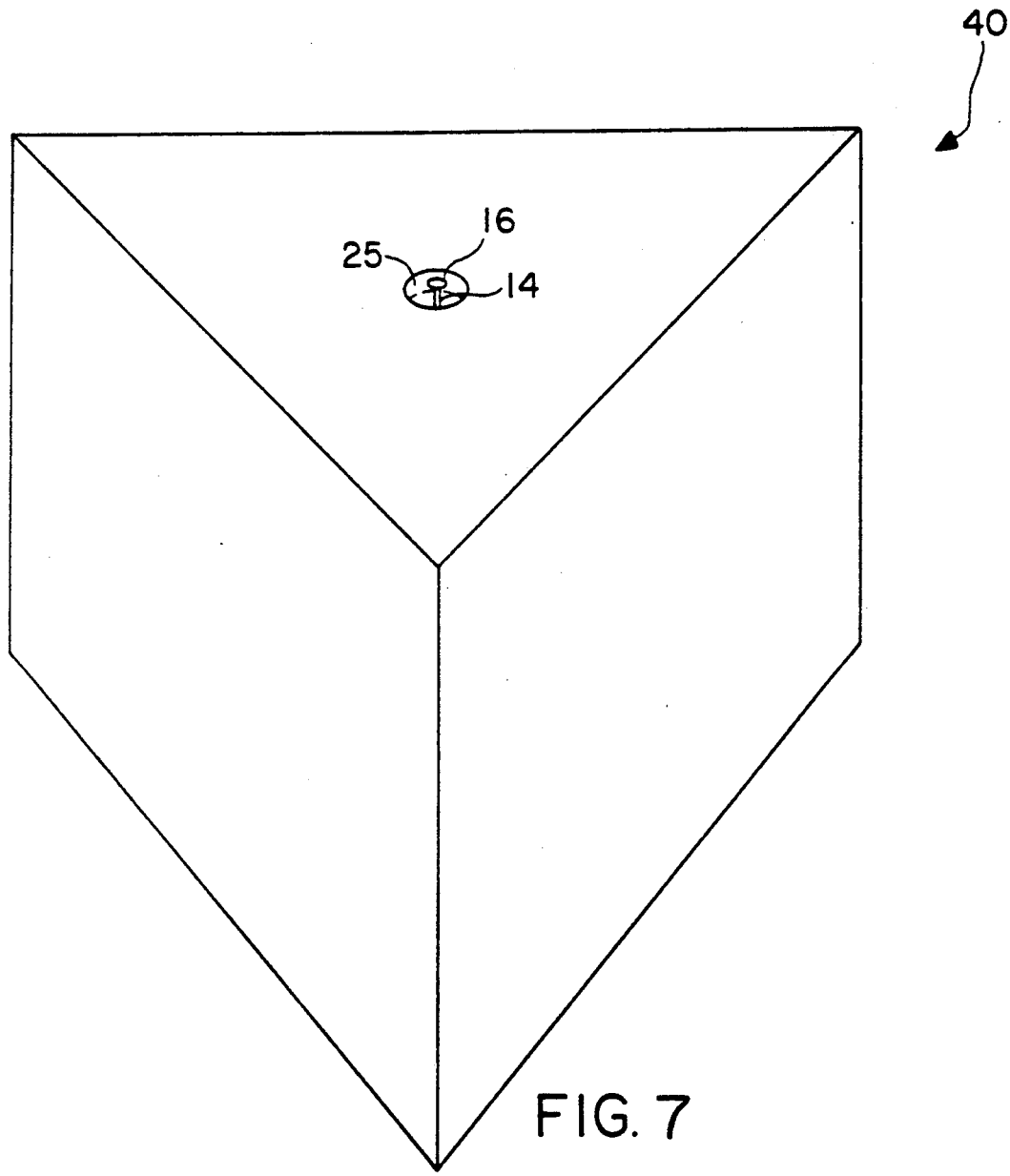
FIG. 7 is an example of a barrel-shaped barrier formed according to the present invention.
Figure 8:
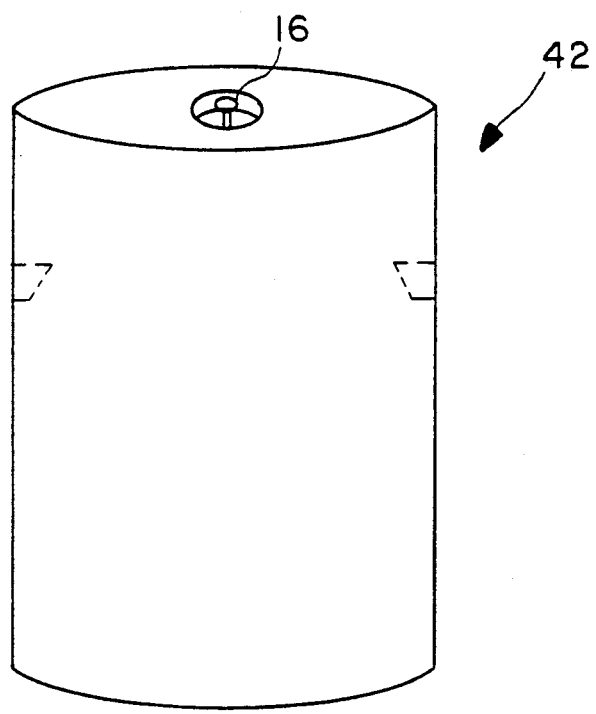
FIG. 8 is another example of a barrel-shaped barrier formed according to the present invention.

FIGS. 7 and 8 show triangular and barrel-shaped barriers, 40 and 42, respectively. The triangle barrier 40 can be used to keep vehicles from striking obstacles such as bridge abutments or overpass pillars. The barrel style 42 can be used as a lane marker or separator. It is readily understood by those skilled in the art that the present invention can be practiced to produce barriers of any shape required.

Although the invention has been described and illustrated in detail, it is to be clearly understood that the same is by way of limitation. The spirit and scope of the present invention are to be limited only by the terms of the appended claims.

What is claimed is:

1. A barrier structure, comprising:
    a cage frame having a base and side walls defining an interior space;
    a plurality of pieces of an elastic material substantially filling the the interior space;
    an epoxy outer layer covering said cage side walls and extending through the cage side walls into the interior space and at least partially in contact with the elastic material.

2. A barrier structure according to claim 1, wherein the epoxy outer layer is a latex rubber elastomeric material and the latex rubber elastomeric material extends into an outer portion of the plurality of pieces of the elastic material in the interior space.

3. A barrier structure according to claim 2, wherein an inner portion of the plurality of pieces of elastic material are loose and form interstices between said pieces.

4. A barrier structure according to claim 3, wherein the plurality of pieces of elastic material are formed from used tires.

5. A barrier structure according to claim 1, wherein the interior space is filled with approximately two inches of its top with a plurality of pieces of elastic material formed from used tires and the remainder is filled with a plurality of pieces of elastic material formed from non-recyclable plastics.

6. A barrier structure according to claim 4, wherein the epoxy outer layer forms a top layer.

7. A barrier structure according to claim 6, further comprising:
    a recess formed in said outer layer;
    a lifting device attached to the base and extending through said recess.

* * * * *